United States Patent [19]

Teich

[11] Patent Number: 4,553,950

[45] Date of Patent: Nov. 19, 1985

[54] FLIP-UP SHIELD ASSEMBLY FOR TRACTOR POWER TAKE-OFF

[75] Inventor: Christian M. Teich, Mannheim, Fed. Rep. of Germany

[73] Assignee: Deere & Company, Moline, Ill.

[21] Appl. No.: 692,463

[22] Filed: Jan. 18, 1985

[30] Foreign Application Priority Data

Jan. 21, 1984 [DE] Fed. Rep. of Germany ....... 3402065

[51] Int. Cl.[4] .............................................. F16D 3/84
[52] U.S. Cl. ...................................... 464/176; 74/609
[58] Field of Search ........................ 74/15.6, 608, 609; 180/53.1; 280/420; 464/170, 176

[56] References Cited

U.S. PATENT DOCUMENTS

| Re. 30,152 | 11/1979 | Davis | 464/176 |
| 2,967,432 | 1/1961 | Du Shane et al. | 74/609 X |
| 3,389,763 | 6/1968 | Meinert | 464/170 X |
| 4,432,742 | 2/1984 | Hartman | 464/176 |

FOREIGN PATENT DOCUMENTS

| 132970 | 11/1946 | Australia | 464/176 |
| 857625 | 1/1961 | United Kingdom | 74/608 |

Primary Examiner—Stuart S. Levy
Assistant Examiner—Daniel P. Stodola

[57] ABSTRACT

A flip-up shield assembly for a tractor PTO in which the shield can be moved from a normal position in which it extends above and to the sides of the PTO shaft to and held in two raised positions, one of which is intended for use when a drive shaft having an oversized universal joint guard is attached to the PTO shaft and the other of which is intended for use simply during the coupling of a drive shaft to the PTO shaft. The shield can be moved to and held in an additional protection position which is located below the normal protection position to provide additional space for an adjustable implement hitch which is adjustably carried by a vehicle above the PTO shaft.

12 Claims, 5 Drawing Figures

FLIP-UP SHIELD ASSEMBLY FOR TRACTOR POWER TAKE-OFF

BACKGROUND OF THE INVENTION

This invention relates generally to shields for tractor power take-off shafts, commonly referred to as PTO shafts, and more particularly relates to a flip-up shield for a tractor PTO shaft.

In tractors provided with PTO shafts, the shaft projects a short distance from the tractor to receive a coupling on a drive shaft for an implement which is attached to the tractor. This coupling is usually part of a universal joint which allows movement of the drive shaft relative to the tractor PTO shaft. In such tractors it is customary to provide an inverted, U-shaped shield secured to the tractor and overlying the top and sides of the PTO shaft to prevent accidental engagement and possible entanglement with the PTO shaft.

Originally such shields were mounted on the tractor in a fixed position and were intended to be permanent. Often, however, the operator would remove the shield to obtain greater assessability to the PTO shaft for attaching or detaching the universal joint and then neglected to remount the shield. This results in a hazardous situation and circumvented the manufacturer's intent to have a safe vehicle. A solution to the operator removing the shield and failing to remount it is shown in U.S. Pat. No. 4,008,583 which issued on Feb. 22, 1977, to Lewis K. Davis, now Reissue Pat. No. Re. 30,152. This patent discloses an inverted U-shaped shield which is pivotally mounted on a tractor and normally assumes a PTO shaft protecting position in which the top wall of the shield extends generally horizontally over the PTO shaft and the sidewalls of the shield extend vertically alongside the PTO shaft. This shield can be pivoted upwardly and engaged in a position in which it leaves the PTO shaft exposed for easy coupling of an implement drive shaft. Once an implement drive shaft is attached, the shield is easily pivoted to its original shaft guarding position. This easy movement of the shield discouraged removal of the shield by the operator and has proven successful in use. Another advantage of this shield was that it could be pivoted to and retained in an intermediate position which permitted use of a large implement shaft with an oversized universal joint shield.

Many tractors are equipped with a trailer hitch which is secured to the tractor chassis above the PTO shaft and many of these hitches were secured to brackets for vertical adjustment to permit the trailer hitch to be positioned for the correct height for each particular trailer. In its lowest position, the adjustable trailer hitch could encroach upon the space occupied by the PTO shaft shield and require removal of the shield. In such a case, the advantages of the above-described flip-up shield would be lost, particularly if the operator failed to remount the shield after the trailer hitch had been raised.

SUMMARY OF THE INVENTION

The principal object of the present invention is to provide a flip-up shield assembly for a tractor PTO shaft which can assume a position below the normal shaft guarding position and, therefore, provide more free space above the PTO shaft.

Another object of the present invention is to provide a flip-up shield for a tractor PTO in which the shield is held in its various positions more securely than prior flip-up shields.

Still another object of the present invention is to provide a flip-up shield assembly for a tractor PTO which includes a stop member which must be moved manually before the shield can be moved to an unguarding position.

The above objects of the present invention, along with additional objects and advantages thereof, will become apparent to those skilled in the art from a reading of the following detailed description when taken in conjunction with the accompanying drawings.

DESCRIPTION OF THE PREFERRED EMBODIMENT

Figure 1:
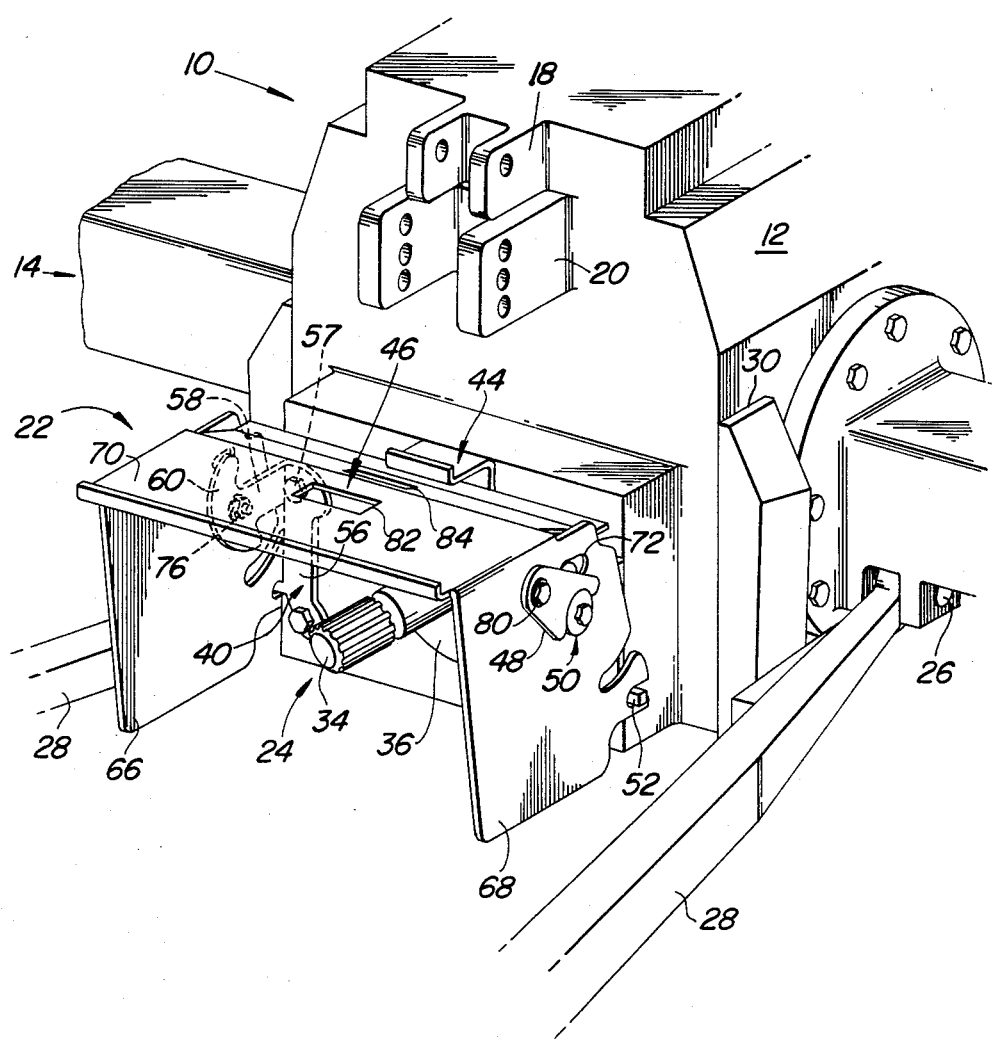
FIG. 1 is a perspective view of a rear portion of a tractor with the flip-up shield assembly according to the present invention.

Referring to FIG. 1, the rear portion of a tractor 10 is partially shown and consists essentially of a gear box 12 and a pair of axle housings 14 secured to the opposite sides of the gear box 12. As will be understood by those skilled in the art, the gear box housing and axle housings form part of the tractor chassis. A bracket 18 is secured to the rear of the gear box 12 for pivotally mounting the upper link (unshown) of a tractor three-point hitch. An additional bracket 20 is secured to the rear side of the gear box 12 below the bracket 18 and serves to mount the vertically adjustable trailer hitch (not shown). The lower links 28 of a three-point hitch are pivotally connected to the lower rear portions of the gear box 12, as at 26, and sway blocks 30 are secured to the extreme rear portions of the sides of the gear box 12 to limit sway of the links 28.

Located in a central portion of the rear of the gear box 12 is a PTO shaft assembly indicated generally at 24 and as shown includes a stub shaft 34 projecting from the rear of the gear box 12 and rotatably supported in a bearing flange 36. The flip-up shield assembly for the PTO shaft 34 is also shown in FIG. 1 and is indicated generally at 22. This shield assembly consists essentially of left and right mounting brackets 40 and 42, a hanger bracket 44, and an inverted, generally U-shaped, shield member 46.

The left and right brackets 40 and 42 are mirror images of each other and each consists of a first portion 56 which is rigidly secured to a rear wall of the gear box 12 by bolts 57 and a second portion 58 which extends rearwardly from the gear box. For reasons which will become more apparent hereinafter, the rear 60 of each of the bracket portions 58 is enlarged and is of generally kidney shape. Each of the brackets 40 also includes a catch pin or abutment member which extends laterally outwardly beyond the side of the gear box 12.

The hanger bracket 44 is rigidly secured to the gear box 12 and extends rearwardly therefrom to an upturned rear edge forming a lip 86. The hanger bracket 44 is located midway between the brackets 40 and 42 and somewhat above them and directly above the PTO shaft 34.

Figure 2:
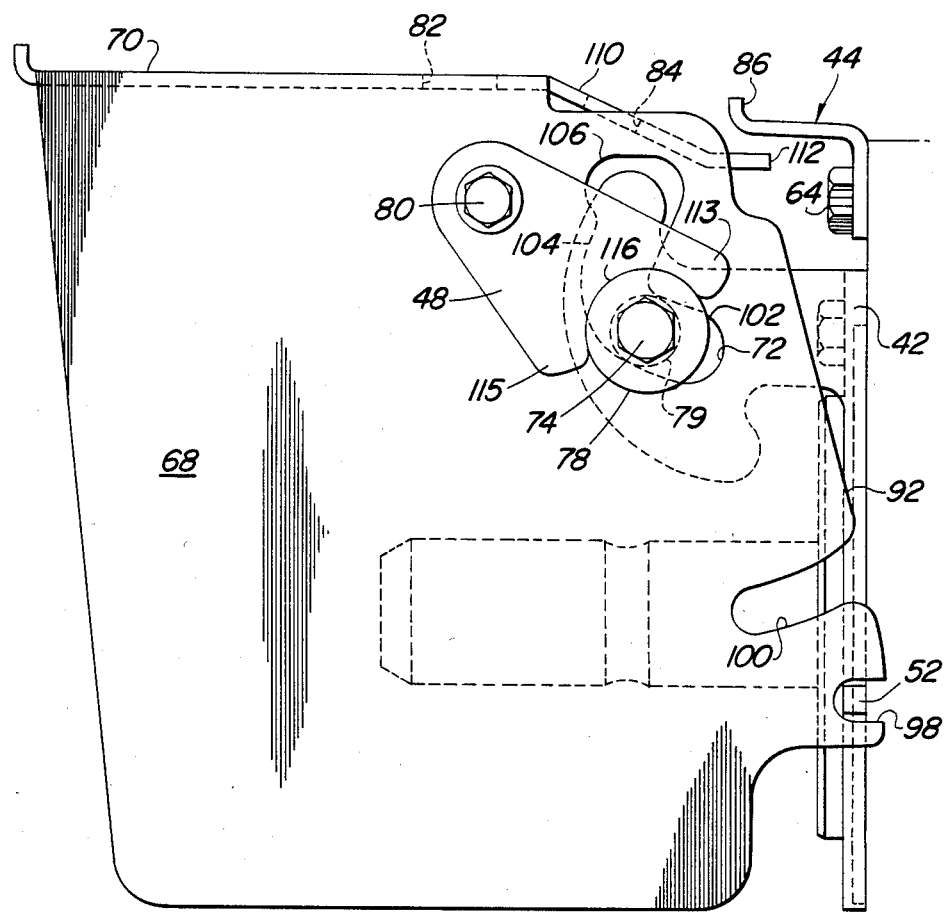
FIG. 2 is a side view of the shield assembly of the invention shown in its normal position.

The shield member 46 includes a top wall 70 and left and right sidewalls 66 and 68. When the shield member is in a normal PTO shaft guarding position as shown in FIG. 2, the top wall 70 assumes a generally horizontal position above the PTO shaft 34 and the sidewalls extend downwardly alongside the PTO shaft 34. The top wall 70 of shield member 46 has a sufficient width in the lateral direction to space the sidewalls 66 and 68 apart a distance greater than the width of that portion of the gear box 12 on which the shield assembly is mounted.

A guide or mounting slot 72 is provided in each of the sidewalls of the shield member near the upper tractor proximate corner thereof and a pivot indicated generally at 50 extends through each of the mounting slots and is secured to the corresponding mounting bracket in the area of the enlarged portions 60. Each of the pivots 50 includes a bolt 74 which extends through a hole in the enlarged portion 60 of the mounting bracket and is held securely in place by a nut 76. Under the head of each bolt 74 is a washer 78 which has a diameter greater than the width of the slot 72 and a bushing 79 is positioned on the bolt 74 between the washer 78 and enlarged portion 60 of the bracket. The bushing 79 permits the bolt 74 to be tightened against the corresponding bracket without clamping the sidewall of the shield member to the bracket and has an outside diameter of a size to just permit the movement of the bushing within the slot 72.

Each of the slots 72 provided in the sidewalls 66 and 68 is generally of arcuate shape and can be considered as having a lower forward portion or segment 102 which extends generally horizontally, although it may have slight incline upwardly to the rear as best shown in FIG. 2, and an upper rear portion 104 which extends generally vertically upwardly from its juncture with the tractor remote end of the lower portion. The extreme upper end of the portion 104 of notch 72 is provided with an enlarged area 106 extending to the rear thereof and this enlarged portion 106 may be considered as a third portion of the slot which extends generally horizontally rearwardly from the tractor when the shield member is in its normal position shown in FIG. 2.

Figure 3:
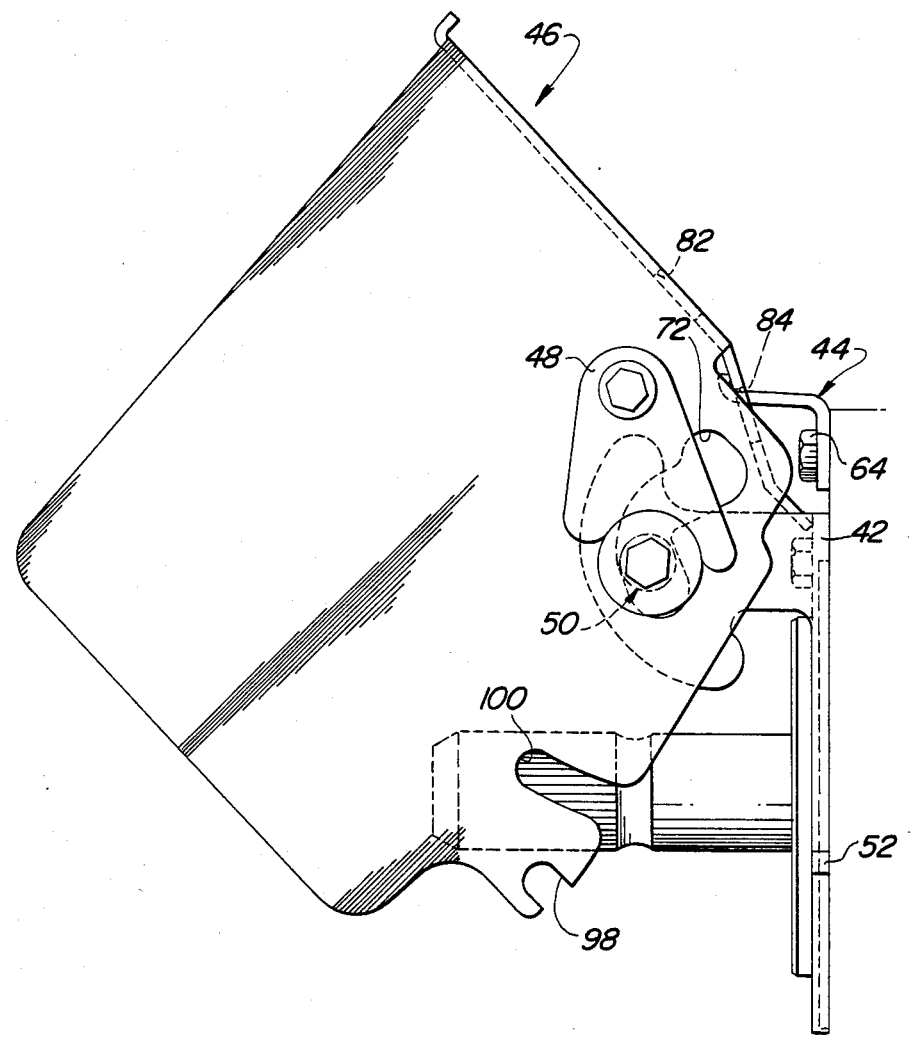
FIG. 3 is a view similar to FIG. 2 and showing the shield assembly in a partially raised position.

An elongated stop member 48 is pivotally mounted at one end thereof to each sidewall to the rear of the upper portion of the slot 72 by a bolt 80. The free end of each elongated stop member 48 is provided with a semi-circular, pivot-engaging notch 116 which is defined by upper and lower legs 113 and 115. Each stop member 48 is positioned such that the notch 116 will engage around the washer 78 when the pivots are in the tractor remote section of the generally horizontal portion 102 of the slot 72, as shown in FIGS. 2 and 3. The upper leg 113 on each stop member 48 is of sufficient length to prevent movement thereof past the pivot no matter where the pivots are located within the slot 72, while the leg 115 has a length which will permit movement by the pivot when the pivot is positioned in the extreme tractor proximate end of the generally horizontal portion 102 of the slot 72. Each of the sidewalls 66 and 68 is provided with a pair of orientation notches 98 and 100 in the lower portion of the tractor proximate edge 92 thereof which are adapted to engage with the abutment members 52 on the mounting brackets 40 and 42. The upper notch 100 is deeper than the lower notch 98 and is formed as an arc having its radius of curvature located in the upper end of the generally vertical portion 104 of the slot 72.

The tractor proximate portion 110 of the upper wall 70 is not connected to the sidewalls 66 and 68 and is angled out of the plane of the main portion of the top wall 70 so that it extends downwardly and forwardly from the remaining portion of the top wall when the shield is in its normal position shown in FIG. 2. A pair of hanger notches or slots 82 and 84 are provided in the top wall 70. The notch 82 is positioned immediately behind the tractor proximate portion 110 and the notch 82 is positioned in the portion 110. The major dimension of each of the notches 82 is slightly greater than the width of the hanger bracket 44 and the minor dimension of each of the notches 82 and 84 is slightly greater than the lip 86 on the hanger bracket 44.

The shield member 46 of the above described shield assembly can assume four distinct positions as is illustrated in FIGS. 2-5. The normal shaft guarding position of the shield member is illustrated in FIG. 2. In this position, the stop member 48 is in engagement with the washer 78 and holds the pivot in the forward portion 102 of the slot 72. The upper edge of the forward portion 102 rests on the bushing 79 and the lower orientation slot 98 is engaged over the abutment member 52. In this normal position, the shield member 46 can pivot about pivots 50 and gravity holds the shield member in position with the notch 98 positioned over and engaging the stop member 52. In this position, pure clockwise movement of the shield member 46 about the pivots 50 is prevented due to the fact that the upper edge of the notch 98 cannot move past the abutment member 52 as long as the shield member is not slid rearwardly on the pivots 50. Thus, accidental displacement of the shield member from the normal position shown in FIG. 2 is extremely unlikely, even though the tractor is moving over rough terrain. Even if the shield member 46 is displaced rearwardly by extreme vibrations a sufficient amount that the notch 98 loses its grip on the abutment member 52, the shield member will simply pivot back under the influence of gravity and either rest on the front edge 92 or re-enter the notch 98.

The shield member 46 can be moved from the normal position illustrated in FIG. 2 to a partially raised position shown in FIG. 3 by pulling the shield to the rear to release the abutment member 52 from the notch 98, rotating the shield member clockwise, then, by raising the shield member slightly, positioning the notch 84 over the lip 86 on bracket 44, and finally lowering the shield so that the lip 86 engages the top wall 70. In this position, the shield is essentially supported by the stop member 48 which is engaged on the pivot 50. An engagement between the lip 86 of the bracket 44 and the top wall prevents the shield member 46 from rotating counterclockwise back to its normal position. In the partially raised position shown in FIG. 3, the top wall 70 of the shield member 46 assumes a position which is at an angle of approximately 45° to the back wall of the gear box 12. As can be seen in FIG. 3, the shield member 46 only partially shields the PTO shaft, but this is a compromised position which is necessary to permit an implement drive shaft with an oversized universal joint guard to be attached to the PTO shaft.

Figure 4:
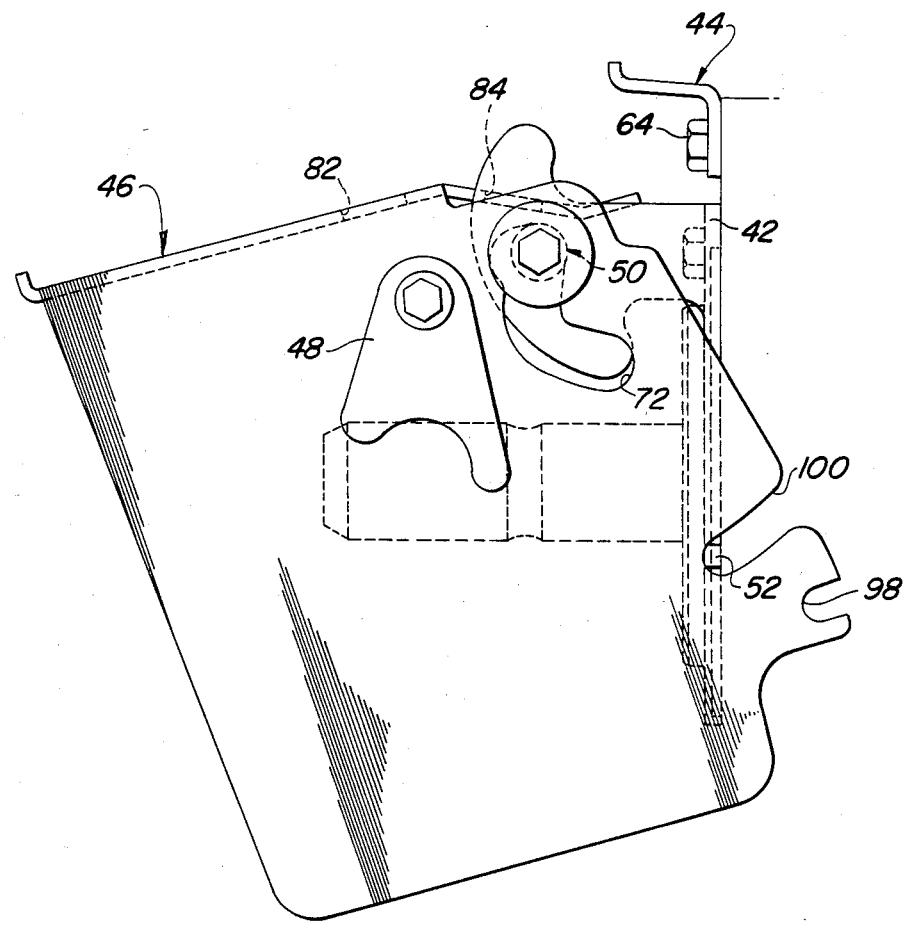
FIG. 4 is a view similar to FIG. 2 and showing the shield assembly in its lowermost position.

FIG. 4 shows the shield member 46 in a shaft protecting position which is lowered from the normal shaft protection position shown in FIG. 2. To move the shield member from the normal FIG. 2 position to the FIG. 4 position, it is necessary to move the shield member rearwardly so that the pivots 50 will be positioned in the extreme forward ends of the lower portions 102 of the slots 72. The operator can then manually pivot the stop members 48 counterclockwise as viewed in FIG. 2 to release them from the pivots 50. The shield member is then pivoted slightly to the rear to space the forward edge 92 of the sidewalls from the rear wall of the gear box 12 and lowered by sliding on the pivots 50 until the pivots 50 are located in the uppermost portion of the slots 72. At this point, the shield member will pivot counterclockwise under its own weight to the lowered protection position shown in FIG. 4. Because of the curvature of the orientation notch 100, the notch 100 moves freely over the abutment member 52 until the inner end of the notch engages the abutment member 52 to establish the position of the shield member. When in the FIG. 4 position, the shield member 46 provides additional free space thereabove so as not to interfere with an adjustable hitch which may be attached to the bracket 20 or with an implement hitch which may be attached hereto.

Figure 5:
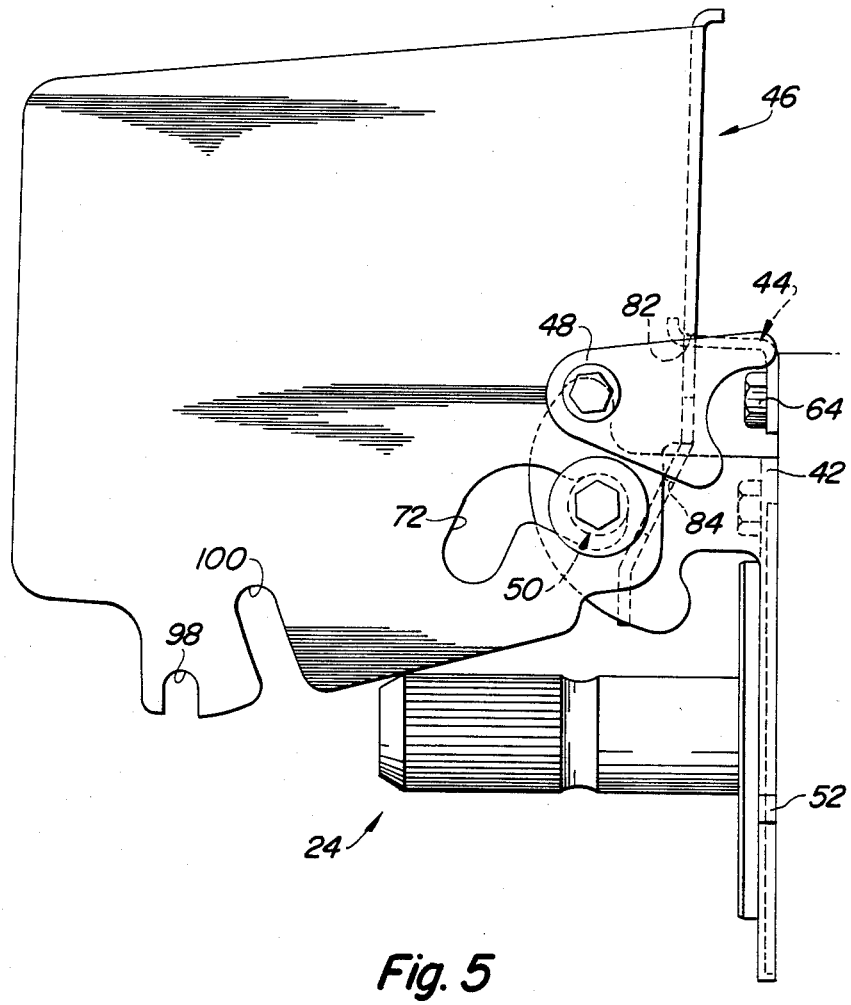
FIG. 5 is a view similar to FIG. 2 showing the shield assembly in its fully raised position.

A final position of the shield member 46 is illustrated in FIG. 5. In this position a shield member is completely removed from the PTO shaft permitting easy access to the shaft for the purpose of coupling an implement shaft thereto. Once the implement shaft is coupled to the PTO shaft, the shield member 46 will be returned to either the FIG. 2 or the FIG. 3 position. To move the shield member 46 to the FIG. 5 position from the FIG. 4 position, it is simply a matter of pivoting the shield member 46 about the pivots 50 so that the hanger bracket 44 extends through the slot 82. The shield member 46 is then lowered over the lip 86 of the bracket 44. With this movement, the bushings 79 of the pivots are located in the enlarged area 106 of the slot portion 104.

Although movement to any position was only described with respect to one other position, it will be well understood by those skilled in the art that the shield member can be moved from any position to any of the other positions by suitable manipulation thereof.

By being able to move the shield member 46 to the various positions, it should be possible to always move it to a position where it does not interfere with any operation or with any other parts and, therefore, removal, except for purposes of repair, should never be required. Also, since it is easier to move the shield from one position to another then it is to remove the shield, removal is discouraged. It should also be noted that because of the kidney shape of the enlarged portion 60 of the brackets 40, the enlarged portion substantially covers the slot 72 in all positions of the shield member except that shown in FIG. 5. This prevents an operator from sticking a finger through the slot 72 where it might come into engagement with the PTO shaft. Although the slot 72 is not covered in the FIG. 5 position, this position is intended to be used only during a manual coupling operating and the PTO shaft will not be rotating during such an operation.

Having described a preferred embodiment of the invention with reference to the several drawings, various modifications within the spirit and scope of the invention will become apparent to those skilled in the art and can be made without departing from the underlying principles of the invention. Therefore, the invention should not be limited to the specific description and illustrations, but only by the spirit and scope of the following claims.

I claim:

1. In a flip-up PTO shield assembly for a tractor having a PTO shaft protruding from a wall thereof, the shield assembly including an inverted, U-shaped, shield member having a top wall and spaced sidewalls extending above and to the sides, respectively, of the PTO shaft when the shield member is in a shaft guarding position, mounting slots and orientation notches provided in the sidewalls of the shield member, means for mounting tne shield member on the tractor wall including pivots positioned through the mounting slots and forming a horizontal axis for slidably and swingably securing the shield member to the means for mounting for movement radially to and around the horizontal axis, the means for mounting having abutment members extending across the path of movement of the tractor proximate edges of the sidewalls and engageable within the orientation notches to hold the shield member in one of a plurality of positions established by the orientation notches when the shield member is slidably and swingably moved from one of the plurality of positions to another; the improvement comprising: said mounting slots provided in the sidewalls having a generally arcuate shape with first and second portions thereof extending generally horizontally and vertically, respectively, when the shield member is in a position in which the top wall forms a horizontal plane; therebeing at least two vertically spaced orientation notches in the tractor proximate edge of each sidewall, the lower notch in each sidewall being positioned from the first portion of the corresponding mounting slot a distance such that the corresponding abutment member engages therein when the pivots are in the first portions of the mounting slots and the shield member is held in a first shaft guarding position in which the top wall is generally horizontal, and the upper notch in each sidewall is positioned from the upper end of the second portion of the corresponding mounting slot a distance such that the corresponding abutment member engages therein when the pivots are in the upper ends of the second portions of the mounting slots and the shield member is held in a second shaft guarding position below the first shaft guarding position.

2. The PTO shield assembly as set forth in claim 1 wherein the second portion of each mounting slot joins the first portion thereof at the end thereof remote from the tractor wall and the upper notch in each sidewall is deeper than the lower notch so that when the shield member is in the second shaft guarding position the upper wall thereof assumes a position in which it is angled downwardly and outwardly from the tractor wall.

3. The PTO shield assembly as set forth in claim 2 wherein the upper notch in each sidewall is formed as an arc with its radius of curvature located at the upper end of the second portion of the corresponding mounting slot.

4. The PTO shield assembly as set forth in claim 2 wherein an elongated stop member is pivotally mounted near one end thereof on each sidewall of said shield member and has a pivot engaging notch in the other end thereof, said stop member being pivotal to and from a pivot engaging position when said pivots are in the extreme tractor proximate ends of the first portions of said mounting slots whereby said stop members, when in the pivot engaging position, engage said pivots and maintain the same in the first portions of said mounting slots and are movable to a non-engaging position in which said pivots may move to the second portions of the mounting slots.

5. The PTO shield assembly as set forth in claim 4 wherein each said stop member is pivotally mounted on said shield member adjacent the upper end of the second portion of the mounting slot on the tractor remote side thereof and the pivot engaging notch in each stop member is defined by a pair of upper and lower legs when the stop member is in its pivot engaging position, the upper leg having a length preventing movement thereof past the pivot in all positions of the pivot in the mounting slot.

6. The PTO shield assembly as set forth in claim 1 wherein said shield assembly further includes a hanger bracket secured to said tractor wall and extending outwardly therefrom over the tractor proximate edge of the top wall of said shield member when said shield member is in the first and second shaft guarding positions, the tractor remote end of said hanger bracket having an upwardly extending lip, and the upper wall of said shield member is provided with a first hanger slot near the tractor proximate edge thereof whereby said shield member may be slidably and pivotably moved about said pivots to a position wherein said hanger bracket extends through said hanger slot and supports said shield member in a third position in which said top wall assumes a position in which it extends upwardly and outwardly from said tractor wall.

7. The PTO shield assembly as set forth in claim 6 wherein an elongated stop member is pivotally mounted near one end thereof on each sidewall of said shield member and has a pivot engaging notch in the other end thereof, said stop member being pivotal to and from a pivot engaging position when said pivots are in the extreme tractor proximate ends of the first portions of said mounting slots whereby said stop members, when in the pivot engaging position, engage said pivots and maintain the same in the first portions of said mounting slots and are movable to a non-engaging position in which said pivots may move to the second portions of the mounting slots, said stop members serving as bearings as said shield member is moved to said third position and maintaining said pivots in the first portions of said mounting slots when said shield member is in said third position.

8. The PTO shield assembly as set forth in claim 7 wherein each said stop member is pivotally mounted on said shield member adjacent the upper end of the second portion of the mounting slot on the tractor remote side thereof and the pivot engaging notch in each stop member is defined by a pair of upper and lower legs when the stop member is in its pivot engaging position, the upper leg having a length preventing movement thereof past the pivot irrespective of the position of the pivot in the mounting slot.

9. The PTO shield assembly as set forth in claim 8 wherein a second hanger slot is provided in the top wall of said shield member spaced from and on the tractor remote side of the first hanger slot, and the second portions of said mounting slots are provided with enlarged areas at the ends thereof remote from said first portions and extending to the tractor remote sides thereof whereby, by moving said stop members to the non-engaging position, said shield member may be moved on and about said pivots so that said pivots are positioned in the ends of the second portions of said mounting slots remote from the first portions and said hanger bracket extends through the second hanger slot, and upon downward movement of said shield member said pivots will move into the enlarged areas of said mounting slots and the lip on said hanger bracket will engage the top wall to hold the shield member in a fourth non-protective position in which said top wall extends substantially parallel to said tractor wall and said PTO shield is left exposed.

10. The PTO shield assembly as set forth in claim 9 wherein a tractor proximate portion of the top wall is angled downwardly from the remaining portion thereof when the top wall is in a generally horizontal position, and the first hanger slot is located in the downwardly angled portion.

11. The PTO shield assembly as set forth in claim 6 wherein a second hanger slot is provided in the top wall of said shield member spaced from and on the tractor remote side of the first hanger slot, and the second portions of said mounting slots are provided with enlarged areas at the ends thereof remote from said first portions and extending to the tractor remote sides thereof whereby said shield member may be moved on and about said pivots so that said pivots are positioned in the ends of the second portions of said mounting slots remote from the first portions and said hanger bracket extends through the second hanger slot, and upon downward movement of said shield member said pivots will move into the enlarged areas of said mounting slots and the lip on said hanger bracket will engage the top wall to hold the shield member in a fourth non-protective position in which said top wall extends substantially parallel to said tractor wall and said PTO shield is left exposed.

12. The PTO shield assembly as set forth in claim 11 wherein a tractor proximate portion of the top wall is angled downwardly from the remaining portion thereof when the top wall is in a generally horizontal position, and the first hanger slot is located in the downwardly angled portion.

* * * * *